(12) United States Patent
Pallanich et al.

(10) Patent No.: US 8,851,824 B2
(45) Date of Patent: Oct. 7, 2014

(54) SELF-POWERED LIFTING AND MOVING DEVICE

(76) Inventors: Robert L. Pallanich, Lenexa, KS (US); Joseph D. Richard, Overland Park, KS (US); Joseph L. Stutsman, Shawnee, KS (US)

( * ) Notice: Subject to any disclaimer, the term of this patent is extended or adjusted under 35 U.S.C. 154(b) by 824 days.

(21) Appl. No.: 12/473,123

(22) Filed: May 27, 2009

(65) Prior Publication Data
US 2009/0297315 A1      Dec. 3, 2009

Related U.S. Application Data

(60) Provisional application No. 61/056,666, filed on May 28, 2008.

(51) Int. Cl.
*B60P 3/12* (2006.01)

(52) U.S. Cl.
CPC .................................... *B60P 3/125* (2013.01)
USPC .......................................... 414/563; 414/469

(58) Field of Classification Search
USPC .................... 414/351, 392, 469, 471, 563;
280/6.155, 5.501, 5.2, 47.2, 43, 43.13,
280/172, 47.1, 5.52, 844, 5.5, 6.15, 6.151,
280/6.156; 172/406; 180/196, 24.02
See application file for complete search history.

(56) References Cited

U.S. PATENT DOCUMENTS

| | | | | |
|---|---|---|---|---|
| 2,557,339 | A * | 6/1951 | Campbell | 296/190.05 |
| 3,360,295 | A * | 12/1967 | Reynolds | 296/190.04 |
| 3,417,832 | A * | 12/1968 | Ziccardi | 180/9.3 |
| 3,869,011 | A * | 3/1975 | Jensen | 180/9.23 |
| 4,709,773 | A * | 12/1987 | Clement et al. | 180/9.32 |
| 5,529,454 | A * | 6/1996 | Alm et al. | 414/478 |
| 5,655,615 | A * | 8/1997 | Mick | 180/24.02 |
| 6,336,783 | B1 * | 1/2002 | Young et al. | 414/563 |
| 7,581,605 | B2 * | 9/2009 | Caspi et al. | 180/9.1 |
| 2007/0194540 | A1* | 8/2007 | Caspi et al. | 280/5.22 |
| 2008/0011525 | A1* | 1/2008 | Kang et al. | 180/9.28 |
| 2008/0093131 | A1* | 4/2008 | Couture et al. | 180/9.1 |

* cited by examiner

*Primary Examiner* — Saul Rodriguez
*Assistant Examiner* — Glenn Myers
(74) *Attorney, Agent, or Firm* — Polsinelli PC; Richard P. Stitt

(57) ABSTRACT

An self-powered apparatus for moving objects that can be rolled or dragged across a surface, one embodiment of the apparatus operating on either of front or rear endless track pairs the apparatus center of gravity being forwardly and rearwardly shiftable to select between use of the front or rear endless tracks for movement of the vehicle across a surface.

20 Claims, 7 Drawing Sheets

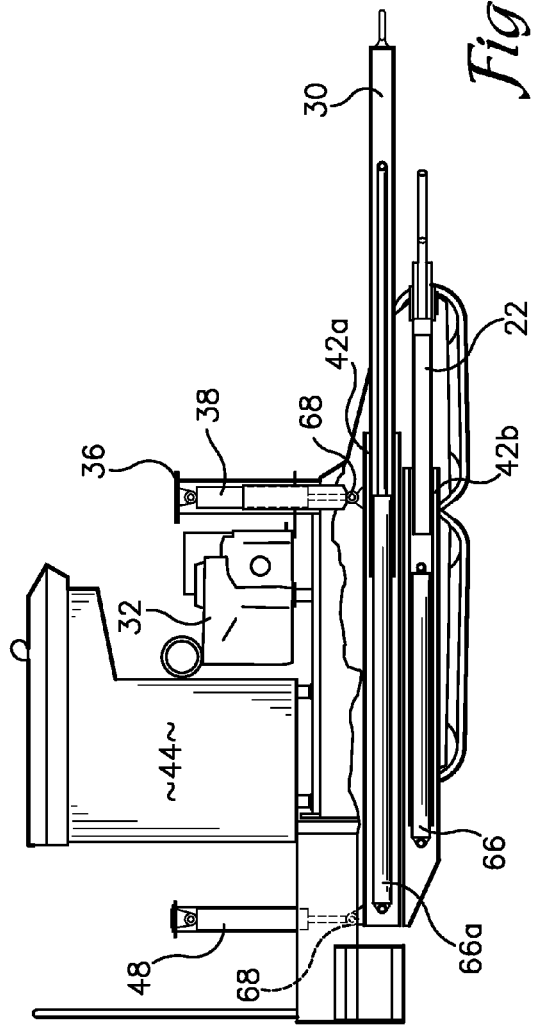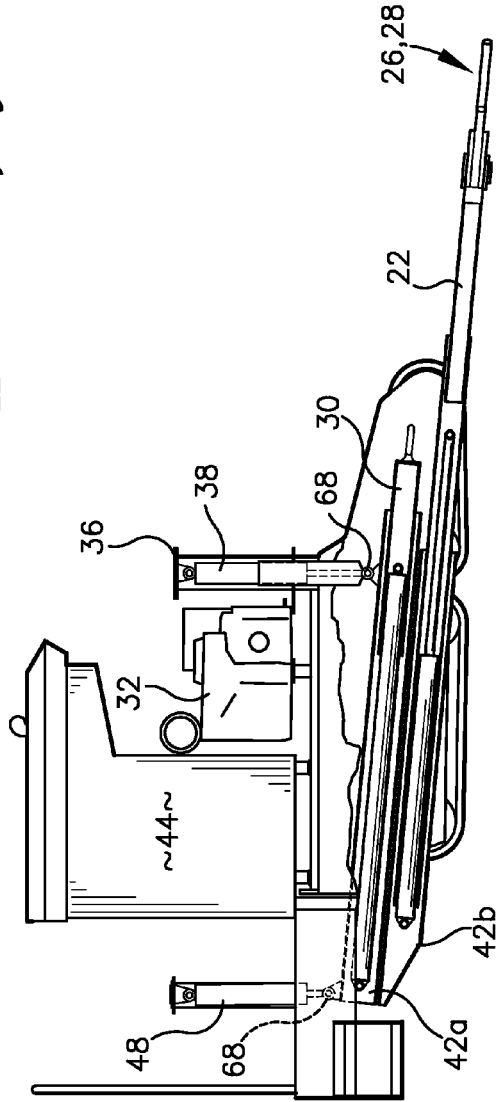

SELF-POWERED LIFTING AND MOVING DEVICE

CROSS-REFERENCE TO PRIOR APPLICATIONS

This application claims priority under 35 U.S.C. 119(e) and 37 C.F.R. 1.78(a)(4) based upon U.S. Provisional Application Ser. No. 61/056,666 filed on May 28, 2008 and titled Self-powered Lifting and Moving Device and which is incorporated herein by reference.

FIELD OF THE INVENTION

The present invention relates to an apparatus for lifting and moving objects. More particularly, the present invention is used to move objects that can be rolled or dragged across a surface. Such objects may include automobiles, trucks, equipment having wheels or drag surfaces and stationary objects. The apparatus is self-propelled by an on-board power source and may be provided with dual pairs of endless tracks that, in one embodiment, are selectably employed for moving the vehicle depending on the position of the center of gravity of the vehicle.

BACKGROUND OF THE INVENTION

In the moving of loads, and in particular loads such as automobiles and trucks at accident locations or at recycling yards or disabled automobiles and trucks located in cover parking areas and ship holds the room to maneuver the load may be very limited. In the case of parking garages and ship holds the height of the area will prevent the use of convention tow trucks and devices. In one extreme case, ship holds, the low ceiling height prevents the use of towing device that have an operator seated on the top of the towing device. In the case of junk yard or recycling yards for automobiles and trucks the close storage of the vehicles in these locations requires a towing device having high mobility and a small turn radius and the ability to accurately manipulate the article or load being moved to avoid damage to the load and to adjacent structures and loads. In addition the ability to quickly, conveniently and safely move a towing device from location to location is nearly always necessary.

SUMMARY OF THE INVENTION

Therefore it is an object to provide an apparatus for lifting and moving vehicles or objects and which apparatus may be used to move vehicles with rotating wheels or objects that may be dragged across a surface when lifted at one end.

It is an object of the apparatus to provide the ability to lift and move a large heavy workpiece such as a motor vehicle with as small a turning radius as possible.

It is another object to provide an apparatus that may operate in limited ceiling height areas such a ship hold and parking garages.

It is yet another object of the apparatus to provide a device that can be operated by radio frequency remote control so an operator in an area having a limited ceiling height can be position next to the apparatus and control the apparatus with a remote control.

An embodiment of the apparatus described herein is, generally, a self-powered, skid-steer type apparatus having a rear pair and a front pair of endless tracks the front and rear tracks may be used independently of each other through the use of a shiftable center of gravity that moves past a fulcrum point and from the rear tracks to the front tracks when a sufficient load is placed on the means for carrying a load that extends from the front of the embodiment of the apparatus.

Another embodiment of the apparatus described herein is, generally, a self-powered, skid-steer type apparatus having forward tracks or treads on either side and having a rear wheel that acts as a pivot for the body of the apparatus as the forward tracks or treads are used to advance and reverse and rotate the apparatus.

The foregoing and other objects are intended to be illustrative of the invention and are not intended in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention.

BRIEF DESCRIPTION OF THE DRAWINGS

Preferred embodiments of the invention, illustrative of the best modes in which the applicant has contemplated applying the principles, are set forth in the following description and are shown in the drawings and are particularly and distinctly pointed out and set forth in the appended claims.

FIG. 4 is a right side, cross-section elevation view of an alternate embodiment of the embodiment shown in FIG. 1 having the rear extension platform with a rear piston supported thereon, and showing a forward piston mounted at the forward bulkhead of the vehicle apparatus, the rear piston allowing operator selected repositioning of the vertical position of the rear pivot of the tow bar and the lift arm combination and the forward piston allowing operator selected repositioning of the vertical position of the forward pivot of the tow bar and the lift arm combination, FIG. 5 is a right side, cross-section elevation view of the embodiment of FIG. 4 showing the rear piston raised to an operator selected position to change the height of the rear pivot of the tow bar and the lift arm combination and showing the forward piston lowered to an operator selected position to change the heights of the forward pivot of the tow bar and the lift arm combination such that the front of the lift arm and tow bar combination extending from the front of the vehicle apparatus is aimed downwardly to place the wheel capture carriages mounted thereon below the level of the tracks;

DESCRIPTION OF THE PREFERRED EMBODIMENTS

As required, detailed embodiments of the present inventions are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
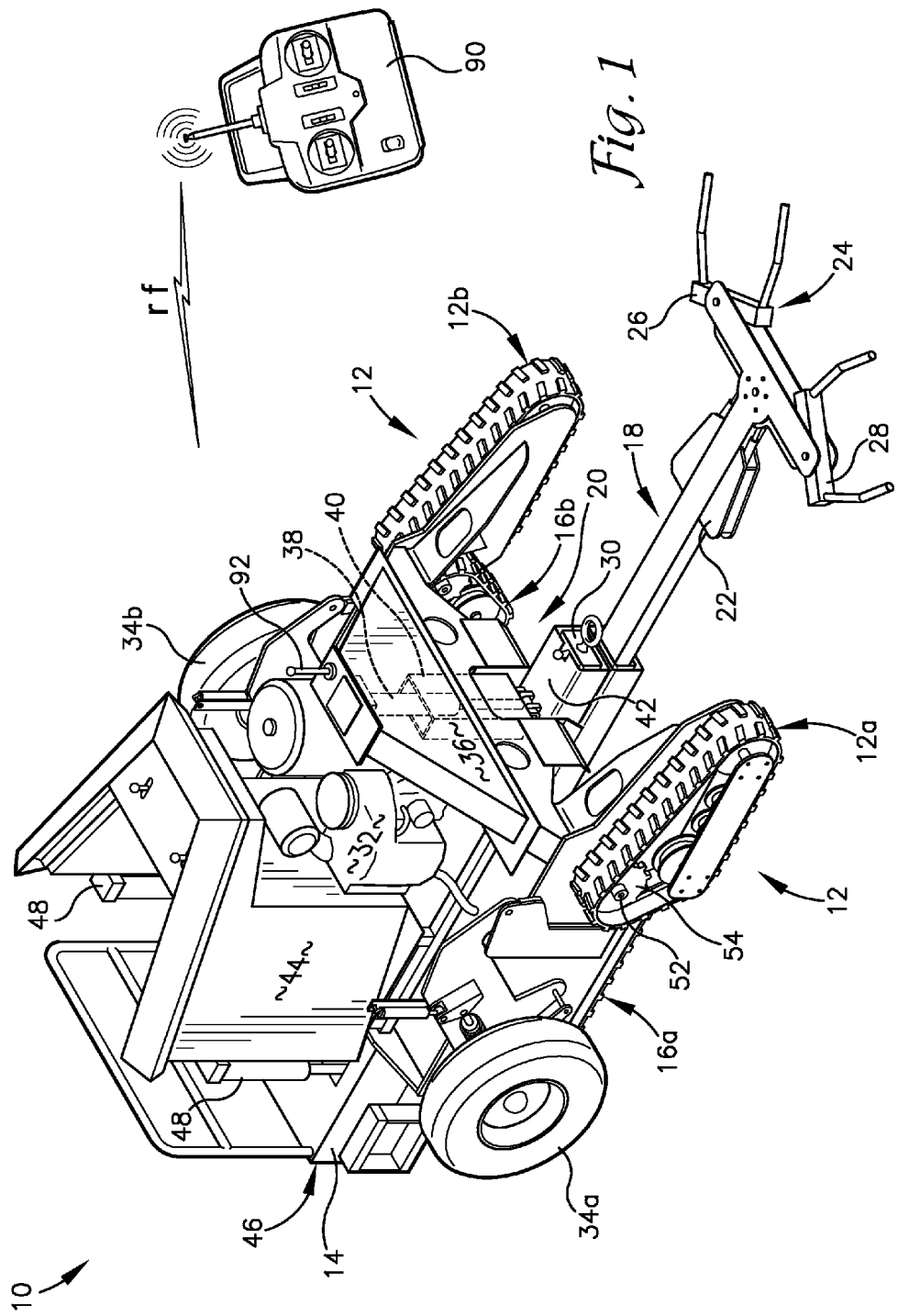
FIG. 1 is a top, front and right side perspective view of an embodiment showing the front or forward endless tracks positioned outboard of the vehicle frame and the rear endless tracks inboard of the vehicle frame and the lift arm extended from the front of the vehicle apparatus with a load grasping device having wheel-capture carriages mounted thereon and the tow bar positioned above the lift arm and retracted and the tow wheels on either side of the frame in the upward or stored position and the a rear extension platform.
Figure 2:
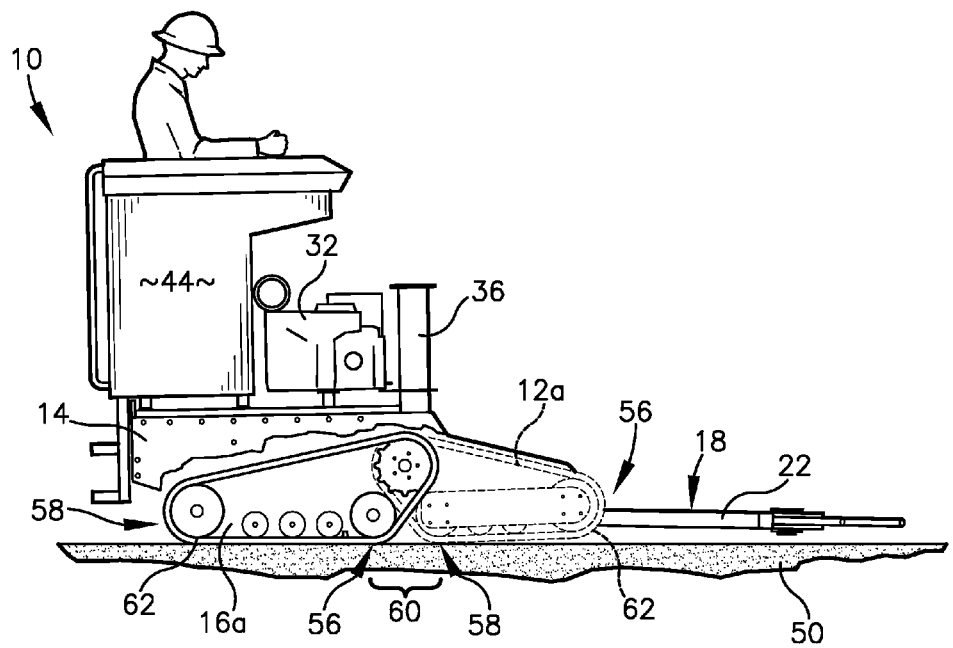
FIG. 2 is a right side elevation view of an alternate embodiment of FIG. 1 having the rear extension platform removed and showing the vehicle apparatus without a load on the lift arm and the center of gravity positioned rearwardly such that the weight of the vehicle apparatus is on the rear tracks.

First referring to FIG. 1, an embodiment of the load moving apparatus 10 is shown having front endless tracks 12 positioned outboard of the vehicle frame 14 and rear endless tracks 16 positioned inboard of the vehicle frame 14. A load carrying means 18 extends from the front 20 of the apparatus 10. In the embodiment of FIG. 1 the load carrying means 18 is a lift arm 22 having a load grasping means 24 attached to the end thereof. In the embodiment of FIG. 1 the load grasping means 24 is a wheel cradle having left and right cradles 26, 28 mounted thereon and which will be described in more detail hereinafter. Extendable from the front 20 of the apparatus 10 is a tow bar 30 which is positioned above the load carrying means 18 or lift arm 22. The tow bar 30 can be used to pull the apparatus 10 behind another vehicle to permit deployment of the apparatus over distances and at higher road speed than could be provided by the on-board engine power supply 32 used to operate the endless tracks 12, 16. To allow such deployment of the apparatus 10 over distances and at higher road speeds a pair of tow wheels 34*a*, 34*b* are provided which are positioned on either side of the vehicle frame 14. In FIG. 1, the tow wheels 34*a*, 34*b* are shown in the upward or stored position thereby allowing the endless tracks 12, 16 to be in contact with the surface 50 (FIG. 2).

In FIG. 1 also is shown a front bulkhead 36 having contained therein, and revealed by phantom lines in FIG. 1, a piston 38 within a ram 40 both of which are pivotally connected to a sleeve member 42 containing the retractable tow bar 30. Generally, the function of the piston 38 is to vertically reposition the tow bar 30 and the lift arm 22. Generally, the function of the ram 40 is to provide resistance against the forward or rearward movement of the tow bar 30 and the lift arm 22 as forces are applied to those structures during use of the apparatus 10. The operation of the piston and the ram will be described in detail hereinafter.

Also shown in FIG. 1 is the operator cab 44 that is removably positioned on the vehicle frame 14 and the rear platform 46 of the vehicle frame 14. Rear platform 46 supports one or more rear pistons 48. As described in detail hereinafter the rear piston, or pistons 48, are connected to rear platform 46 and are pivotally connected to the tow bar 30 rear and the lift arm 22 rear for adjustment of the vertical position of the rear portions of the tow bar 30 and the lift arm 22 to permit vertical adjustment of the angle of the front end of the tow bar and the lift arm with respect to the surface 50 (FIG. 2) on which the apparatus 10 is operating.

Now referring to FIG. 2 the operation of the dual endless tracks 12, 16 will be described. The apparatus 10 has two pairs 12, 16 of endless tracks, a forward track pair 12*a*, 12*b* and a rear track pair 16*a*, 16*b*. One track of each pair is mounted on each of the opposed sides of the vehicle frame 14—the frame right side or the frame left side of the vehicle frame 14. The right side front and rear endless tracks 12*a*, 16*a* or the left side front and rear endless tracks 12*b*, 16*b* are operated off a common drive shaft 52 connected to a drive sprocket 54. This is accomplished by positioning the rear endless track pair 16*a*, 16*b* inboard of the vehicle frame 14 and the front endless tracks 12*a*, 12*b* outboard of the vehicle frame so that the drive sprocket 54 for the right side front endless track is at the rear of the front track 12*a* and the drive sprocket 54 for the rear endless track is at the front of the rear track 16*a*. This aligns the drive sprockets 54 and permits a common drive shaft 52 to be used to direct power to both right side front track 12*a*, and right side rear track 16*a*, with a left side drive shaft to direct power to both left side front track 12*b*, and left side rear track 16*b*.

Figure 3:
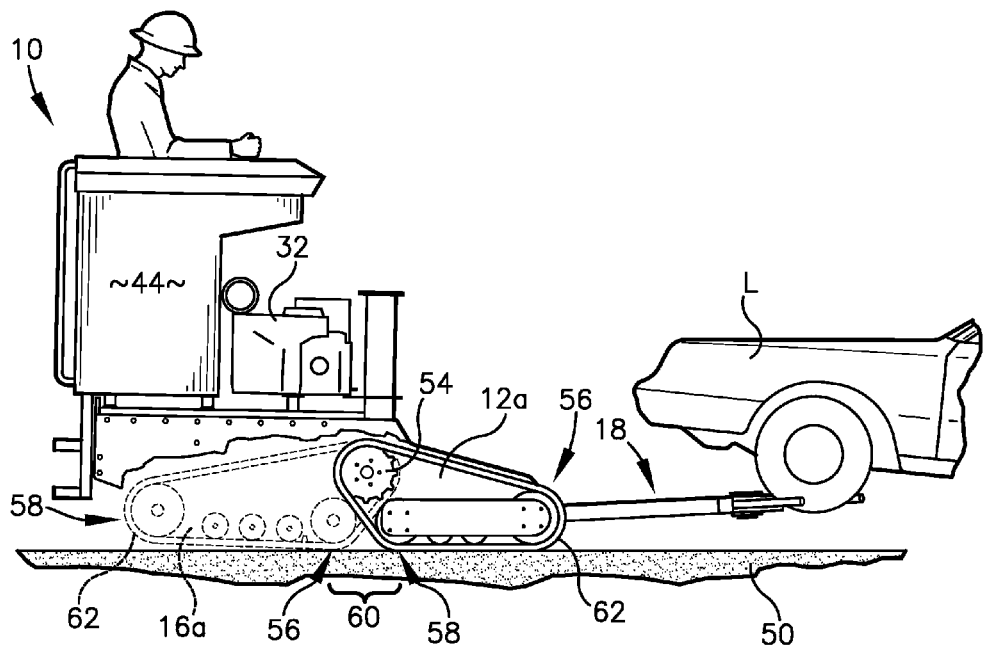
FIG. 3 is a right side elevation view of the embodiment of FIG. 2 showing the vehicle apparatus with a load on the lift arm thereby shifting the center of gravity forwardly such that the weight of the vehicle apparatus is on the front tracks.

In FIGS. 2 and 3 it is shown that the front and rear tracks 12, 16 are mounted on the vehicle frame 14 at an angle such that an end of each track is elevated with respect the opposite end of each track. Specifically, and with respect to the front endless track 12*a*, 12*b* the front tracks are mounted on the frame 14 at an angle so the front 56 of the front track 12*a*, 12*b* is positioned slightly higher than the rear 58 of front track 12*a*, 12*b* with respect to the vehicle frame. In contrast, the rear endless tracks 16*a*, 16*b* are mounted on the vehicle frame 14 at an angle so that the rear 58 of the rear track 16*a*, 16*b* are positioned slightly higher than the front 56 of the rear tracks 16*a*, 16*b*. This angled mounting creates a fulcrum point 60 for the vehicle apparatus 10 at a location comprising the rear 58 of the front tracks 12*a*, 12*b* and front 56 of the rear tracks 16*a*, 16*b*. This fulcrum point 60 allows for a shifting of the center of gravity of the vehicle 10 which causes either the front endless track pair 12*a*, 12*b* or rear endless track pair 16*a*, 16*b* to be the main support of the weight of the vehicle at any one time. This shifting of the weight, or the center of gravity, of the vehicle to the front or to the rear of the fulcrum point is governed by the placement of a load "L" (FIG. 3) on the load carrying means 18 such as lift arm 22. For example, when the load carrying means 18 is not supporting a load the center of gravity of vehicle 10 is positioned rearwardly along the horizontal axis of the vehicle and the vehicle weight is to the rear of the fulcrum point 60 and the weight of the vehicle is generally, fully supported on the rear endless tack pair. 16*a*, 16*b*. This is so because the center of gravity of the vehicle is determined by the weight distribution of the vehicle 10 only as there is no load. In this situation, the center of gravity of the vehicle without a load on the load carrying means 18 is over the rear tracks of the vehicle. Thus, in the absence of a load sufficient to shift the center of gravity away from the location established during manufacture of the vehicle, the rear tracks 16a, 16b support the vehicle and are operable to steer and move the vehicle.

Alternatively, as shown in FIG. 3, when the vehicle is supporting a load "L" on the load carrying means 18 or the lift arm 22 the weight of the vehicle is supported on the front endless track pair 12a, 12b. This is so because with the addition of the weight of a load on the load carrying means 18 or lift arm 22, the center of gravity of the vehicle is shifted away from the location established during manufacture of the vehicle and toward the front of the vehicle. This shifting of the center of gravity toward the front causes the center of gravity to be moved forward of the fulcrum point 60 of the vehicle. This forward shift of the center of gravity results in the front tracks 12a, 12b supporting the vehicle 10 and load weight and the front track pair 12a, 12b operating to steer and move the vehicle.

A second aspect of the above-described angled mounting of the track pairs 12, 16 is that it provides clearance between the surface 50 and the treads 62 of the track pair 12, 16 that is not engaged in supporting the vehicle 10. In particular, it will be appreciated that when the weight of the vehicle is supported on the rear track pair 16a, 16b the rear 58 of the front track pair 12a, 12b is only slightly in contact with the surface 50. The portion of front track 12a, 12b that is forward of the rear 58 of the front track 12a, 12b is slightly elevated above the operating surface. The slight elevation of the tracks spaces the bottom of the front track tread 62 from the surface 50 and allows each pair of front tracks 12a, 12b and each pair of rear tracks 16a, 16b to operate in the skid steer manner of operation without a second pair of tracks being in contact with the surface 50 and impeding the operation of the tracks that are supporting the weight of the vehicle.

An additional benefit is derived from the shifting of the center of gravity and the shifting between the operating endless tracks from the rear endless tracks to the front endless tracks. It will be appreciated that when vehicle 10 is not supporting a load on the load carrying means 18 or the lift arm 22 the weight of the vehicle is supported on the rear endless track pair 16a, 16b. This places the pivot point of the tow bar 30 or the lift arm 22 near the rear of the apparatus 10. As a result of this rearward location of the pivot point, a small left to right movement in the position of the vehicle 10 produces a large effect at the front end of the tow bar 30 or the lift arm 22.

In contrast, when vehicle 10 is supporting a load on the load carrying means 18 or the lift arm 22 the weight of the vehicle is supported on the front endless track pair 12a, 12b. This places the pivot point of the tow bar 30 or the lift arm 22 near the front of apparatus 10. As a result of this forward location of the pivot point, a small left to right movement in the position of the vehicle 10 produces a small effect at the front end of the tow bar 30 or the lift arm 22. This change in the control effect provided to the front end of the tow bar 30 or the lift arm 22 as a result of the two different pivot locations has great utility when moving vehicle 10 into position to grasp a load and when moving vehicle 10 to move a load while clearing obstructions adjacent to the load. For example, when apparatus 10 is being used to pick-up and move an automobile, it is useful to make larger incremental changes in the position of the front end of lift arm 22 during the approach to the vehicle. During this circumstance, there is no load on the vehicle 10 and clearing obstructions is less difficult as there is no load obstructing the operator's view of the working field. When no load is on lift arm 22 the changes in position made by the operator will have a large effect at the end of lift arm 22 as the pivot point of lift arm 22 is located toward the read of vehicle 10 and approximately midway along the longitudinal axis of the rear endless track pair 16a, 16b. In contrast, when a load is placed on lift arm 22 the vehicle will be operating on the front endless track pair 12a, 12b and the pivot point of lift arm 22 is shifted forward to a location approximately midway along the longitudinal axis of the front endless track pair 12a, 12b. This shortening of the length between the pivot point and the front end of lift arm 22 produces a lesser left to right movement at the front end of lift arm 22 in response to the operator making the same control movement as was made by the operator when the vehicle 10 was operating on the rear pair of endless tracks 16a, 16b. This smaller movement is beneficial when a load is on lift arm 22. With a load on the lift arm 22 the operator's view is obstructed by the load and as the operator desires to avoid contacting any object near the load (in this case an automobile) the smaller position changes provided by the forward pivot point allows the operator to more carefully move the automobile that is on lift arm 22 while using the same set of controls.

Yet another benefit is achieved by the provision of both front and rear tracks 12a, 12b and 16a, 16b. As was described above, when a load "L" is on lift arm 22 the load will cause the apparatus 10 to rely on the front endless tracks 12a, 12b for operation and the rear tracks 16a, 16b will be slightly above the surface allowing unobstructed skid steer operation by the single front track pair 12a, 12b. However, if the apparatus 10 is on a soft surface, such as mud or loose sand, and the weight of the apparatus 10 causes the apparatus to sink into the soft surface, both front and rear tracks 12a, 12b and 16a, 16b will be brought into operational contact with the ground. This contact allows the weight of the apparatus 10 to be distributed over all four tracks 12a, 12b and 16a, 16b and aids in preventing further sinking of apparatus 10 into the soft surface. Also, as a soft surface is malleable, the skid steer function can be employed using all four tracks 12a, 12b and 16a, 16b as the soft surface will give way and only minimally impede the pivoting action with all four tracks in contact with the soft surface.

Referring now to FIGS. 4 and 5 the operation of the load carrying means 18 and the tow bar 30 will be described. One embodiment of the apparatus is provided with front and rear vertical elevation control of the tow bar 30 and the load carrying means 18. In FIGS. 4 and 5 the load carrying means 18 is lift arm 22 having wheel cradles 26, 28 thereon for grasping the front or rear wheels of an automobile or truck or the like. It will be appreciated that alternatives for lift arm 22 can be used as the load carrying means 18. For example, a forklift fork could be used or a flat platform could be used or any number of designs and devices could be selected that allow the grasping or carrying of a load can be substituted for lift arm 22 on load carrying means 18. Tow bar 30 is extendable and retractable as it is supported within sleeve 42a that allows telescopic extension and retraction of tow bar 30 with respect to sleeve 42a. The extension and retraction of the tow bar is operated by a piston 66a within sleeve 42a which operates to extend and retract tow bar 30 in response to operator control activation. In the same manner, lift arm 22 also is retractable and extendable and is contained in sleeve 42b to allow telescopic extension and retraction of lift arm 22 with respect to sleeve 42b. The extension and retraction of the tow bar is operated by a piston 66b within sleeve 42b which operates to extend and retract lift arm 22 in response to operator control activation.

Still referring to FIGS. 4 and 5 the manipulation of the vertical position of tow bar 30 and lift arm 22 will be described. In FIG. 4 it will be appreciated that sleeves 42a, 42b are pivotally connected to pistons 38, 48 by a ring-andshaft connection 68 thereby allowing sleeves 42a, 42b to be operated in tandem by pistons 48 and 38 which are connected, respectively, at the rear and at the front of sleeves 42a, 42b. The pivoting or rotatable ring-and-shaft connection 68 of pistons 38 and 48 allows the operator of apparatus 10 to independently change the vertical position of the front and rear of sleeves 42a, b and thereby change both the height and the angle of sleeves 42a, b with respect to the surface 50 (FIG. 3). It will be appreciated that extension and retraction front piston 38 will change the vertical position of the front of sleeve 22a, b and that extension and retraction of rear piston 48 will change the vertical position of the rear of sleeve 22a, b. By employing various combinations of the extension and retraction of pistons 38, 48 both the height of sleeves 42a,b above surface 50 can be changed and by extending on of piston 38, 48 and retracting the other of pistons 38, 48 the angle of sleeves 22a,b with respect to surface 50 can be changed. For example, by retracting rear piston 48 and extending front piston 38 sleeves 42a, b will be positioned at an angle that can aim cradles 26, 28 downwardly. This downward position shown in FIG. 5 may be useful in retrieving an automobile from the downhill slope of a roadside or a divided highway median. Once the automobile or the like has been secured within cradle 26, 28, the operator can effect the retraction of front piston 38 and the extension of rear piston 48 bring the sleeves 42a, b into a level position (FIG. 4 and FIG. 3) to permit movement of the automobile by apparatus 10.

Figure 6:
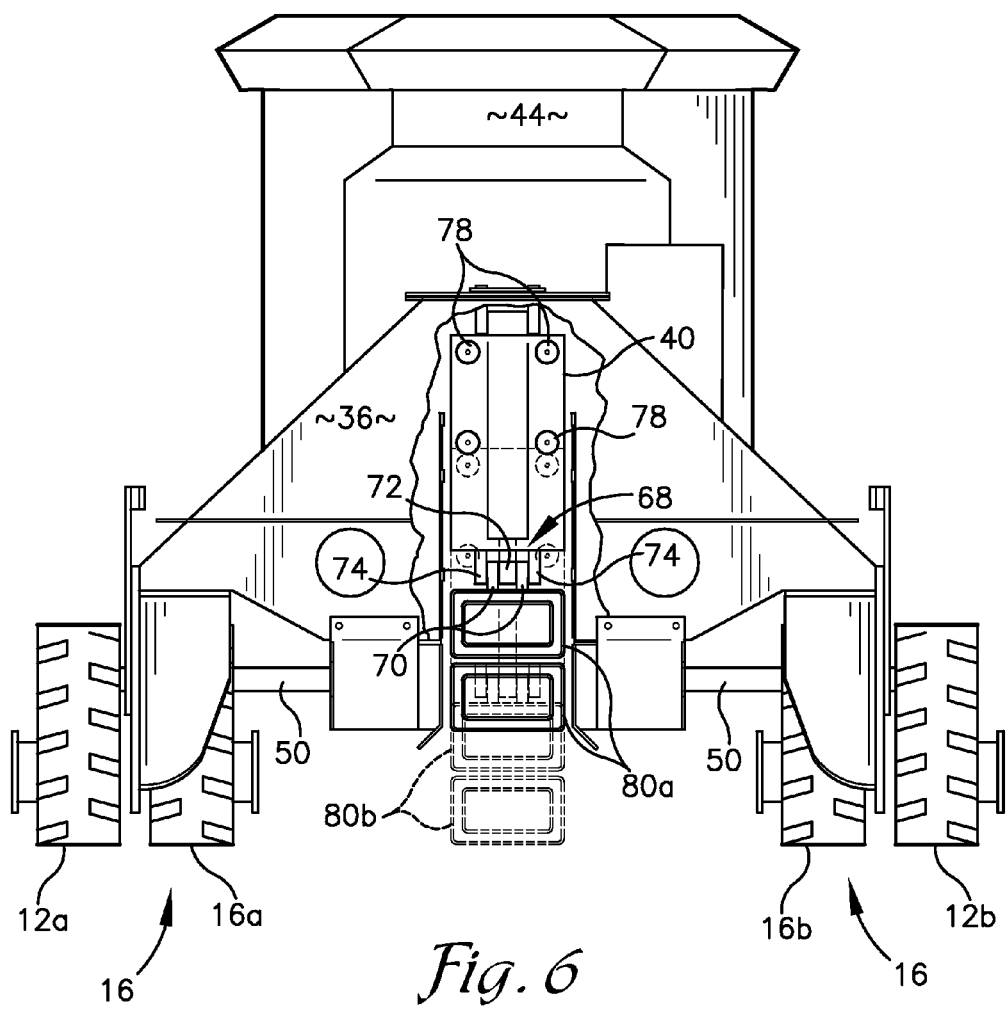
FIG. 6 is a cross-section elevation view of the embodiment of FIG. 1 and the alternate embodiment of FIG. 4 a portion of the forward bulkhead cutaway to reveal the piston contained therein and the ram contained therein, the piston operating to raise and lower the forward pivot of the tow bar and the lift arm combination and the ram operating to limit the forward to rear movement of the tow bar and lift arm combination.

In FIG. 6 front bulkhead 36 of apparatus 10 is shown with a portion thereof cutaway to reveal ram 40 that is contained within bulkhead 36. Within ram 40 is positioned front piston 38 the operation of which was described above. Pivoting or rotating ring-and-shaft connection 68 of pistons 48 and 38 to sleeve 42a is shown in FIG. 6 and is comprised of two rings 70 connected to sleeve 42a, and ring 72 connected to piston 38 and two rings 74 connected to ram 40. Rings 70, 72 and 74 are rotatably connected by a shaft (not shown) that passes through rings 70, 72, and 74. To secure sleeves 42a, b from front to rear shifting with respect to frame 14 of apparatus 10 a ram 40 is provided within bulkhead 36. Ram 40 can travel up and down within bulkhead 40 and serves to limit the front to rear shifting of sleeves 42a, b. Ram 40 slidably moves up and down within bulkhead 36 on pads 78 which in a preferred embodiment are formed of nylon. The use of ram 40 to resist against front to rear shifting of sleeves 42a,b in response to the forces applied when apparatus 10 is pushing and pulling on a load avoids placing such from front to rear shifting stress on pistons 38, 48 of apparatus 10. In FIG. 6 the upper position 80a and lower position 80b of sleeves 42a, b are shown with the lower positions 80b shown in phantom lines.

Figure 7:
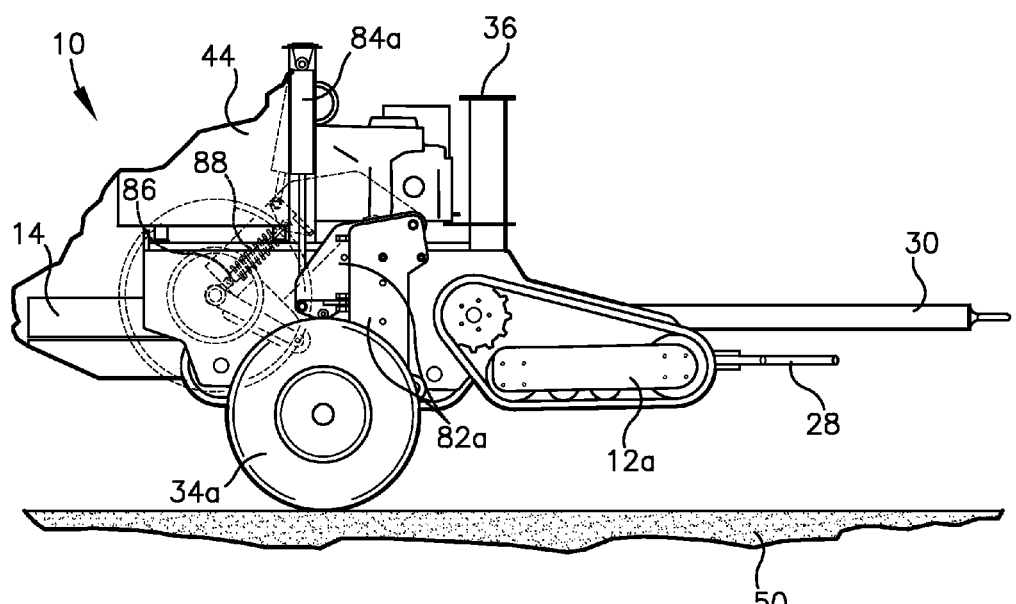
FIG. 7 is a right side, fragmented elevation view of an embodiment showing the tow wheels on either side of the frame in the lowered position and the front and rear endless tracks elevated to a position above the surface to allow towing of the apparatus by another vehicle and showing in phantom lines the elevated position of the tow wheels that allows the endless tracks to contact the surface.

Referring now to FIG. 7 the use and operation of tow wheels 34a, b will be described. Tow wheels 34a,b are provided to allow apparatus 10 to travel over longer distances and at higher road speeds than would be useful or safe using endless tracks 12, 16. Tow wheels 34a, 34b are connected to frame 14 of apparatus 10 by mounting plate 82a,b with one tow wheel 34a and mounting plate 82a on the right side of frame 14 and one tow wheel 34b and mounting plate 80b on the left side of frame 14. Tow wheels are pivotally raised and lowered by piston 84a, b which is connected between frame 14 and mounting plates 82a, b. Tow wheels 34a, b are provided with a suspension comprised of a spring 86 and a shock absorber 88. As shown in FIG. 7, and as previously described, tow wheels lift endless tracks 12, 16 above surface 50 to permit movement of apparatus 10 on the tow wheels only.

Again referring to FIG. 1, a radio frequency controller 90 is shown in FIG. 1 which can be used to allow apparatus 10 to be manipulated by an operator who is not in the cab 44 of apparatus 10. The radio frequency remote controller 90 transmits a radio frequency signal to an antenna 92 and receiver 94 (not shown) on bulkhead 36. The radio frequency remote control permits an operator to be near apparatus 10 or in front or in back of apparatus 10 so the operator may better view the connection of the lift arm 22 to the load and better view the manipulation of the lift arm 22. In addition, cab 44 is constructed so that it may be removed from frame 14 to allow apparatus 10 to operate in an area having a limited ceiling height. Such areas having a limited ceiling height present another opportunity for using the radio frequency remote control of the apparatus. The embodiment of FIG. 1 with the cab 44 removed has a height of approximately five feet and one inch above the surface on which the apparatus 10 is positioned.

Figure 8:
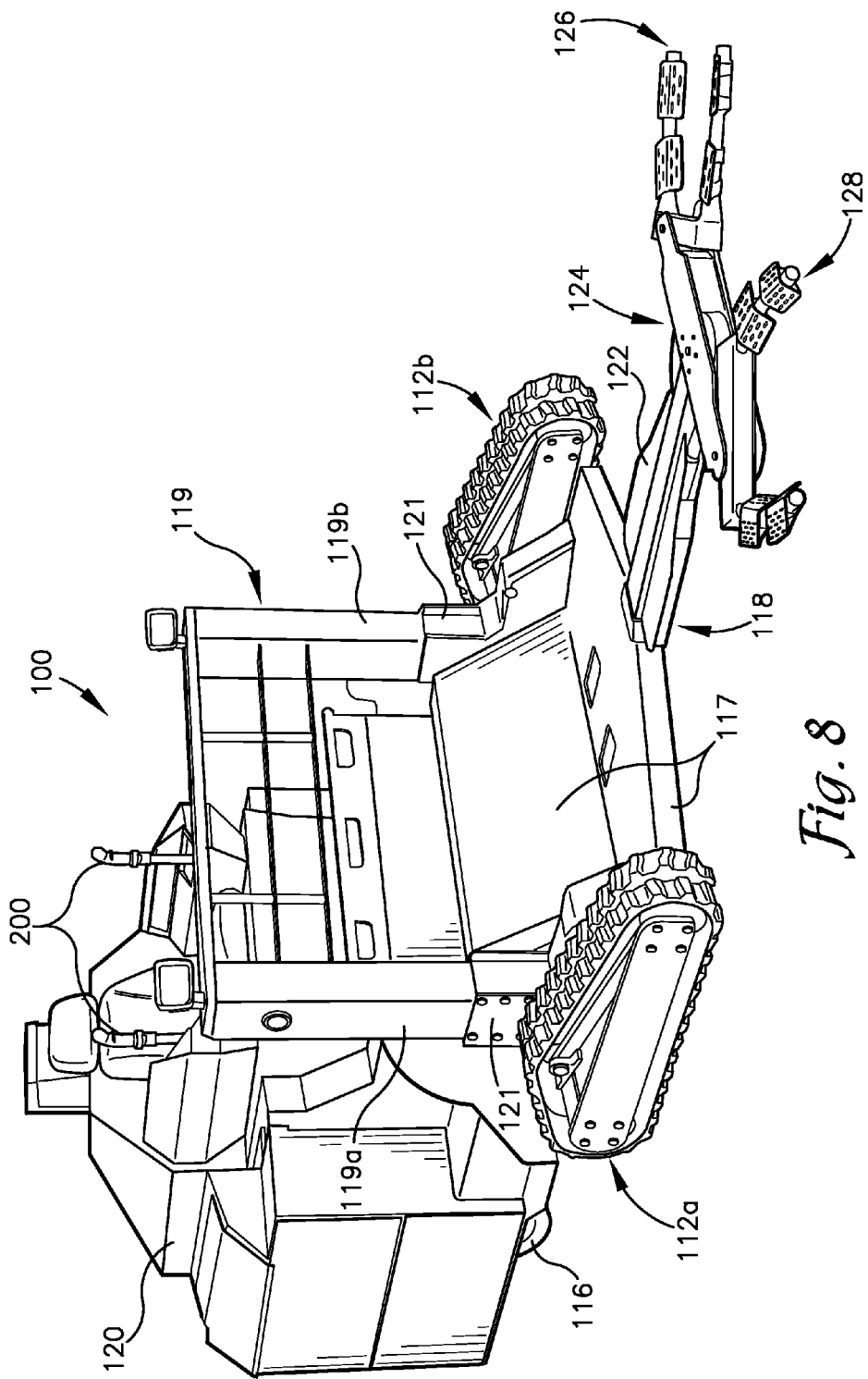
FIG. 8 shows an alternate embodiment having a pair of front endless tracks and a rear castor wheel and a front elevator plate for raising and lowering the lift arm having a wheel cradle attached thereto.

FIG. 8 shows an alternate embodiment 100 having a pair of front endless tracks 112 and a rear castor wheel 116 and a front elevator plate 117 that is raised and lowered by elevator mechanism 119 for raising and lowering the lift arm 122 and having a wheel cradle 124 attached thereto. In the embodiment of FIG. 8, apparatus 100 is provided with an enclosed engine 120 and a load carrying means 118 comprising lift arm 122 and wheel cradle 124 and left and right tire cradles 126, 128. Apparatus 100 is provided with hand manipulated skid steer drive provided by endless track 112a, b steering controls 200. Elevator plate 117 can be vertically repositioned in the direction of arrow "A" (FIG. 9) by elevator mechanism 119. Elevator mechanism 119 raises and lowers elevator plate 117 by repositioning elevator plate 117 along the height of columns 119a and 119b. Elevator plate 117 is connected to columns 119a, b guides 121 on either side of elevator plate 117.

Figure 9:
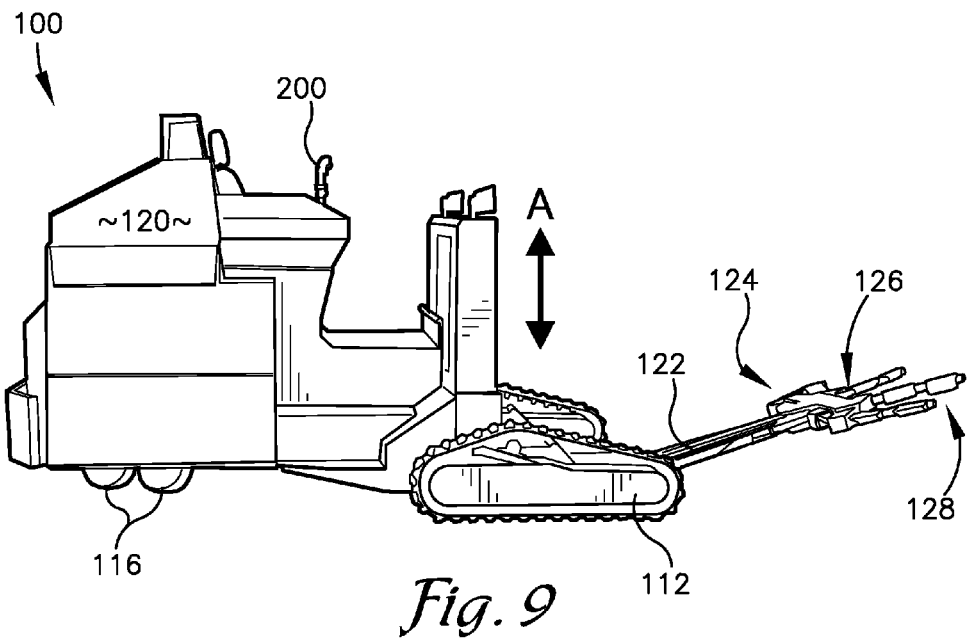
FIG. 9 is a side elevation view of the embodiment of FIG. 8 showing the a front elevator plate raising the lift arm having and wheel cradle into an elevated position.

FIG. 9 is a side elevation view of the embodiment 100 shown in FIG. 8. In FIG. 9 front elevator plate 117 has been repositioned to angle lift arm 122 and wheel cradle 124 into an upward position. Such an upward position is useful in raising a load for movement by apparatus 100

Figure 10:
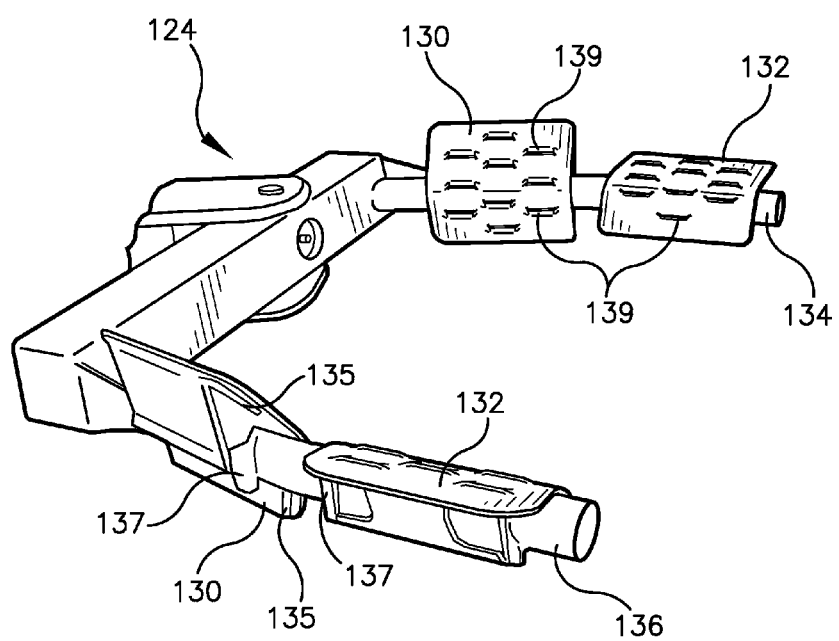
FIG. 10 is an enlarged view of one of the wheel cradles and showing the rotatable engagement plates thereon.

FIG. 10 is an enlarged view of wheel cradle 124 showing opposed pairs of wheel engagement pads 130 and 132. Wheel engagement pads 130, 132 are mounted on arms 134, 136 of cradle 124 and engagement pads are rotatable on arms 134, 136. The rotation of engagement pads 130, 132 allows the pads to be repositionable for capture of a wheel assembly between pads 130, 132 of wheel cradle 124. Flanges 137 are provided on arms 134, 136 to limit the rotation of the pads as stops 135 on pads 130, 132 come into contact with flanges 137. Pads 130, 132 are provided with gripping projections 139 that extend outwardly to grip the automobile tire or other object that is placed in wheel cradles 126, 128. It will be appreciated the pad 130, 132 rotate in response the pressure of the automobile tire and allow the tire to seat between the pads 130, 132 while the pads rotate into a position that most deeply seats the tires within the grasp of pads 130, 132.

Having now described the features, discoveries and principles of the invention, the lifting and moving apparatus is constructed and used, the characteristics of the construction, and advantageous, new and useful results obtained; the new and useful structures, devices, elements, arrangements, parts and combinations, are set forth in the appended claims. It is also to be understood that the following claims are intended to cover all of the generic and specific features of the invention herein described, and all statements of the scope of the invention, which, as a matter of language, might be said to fall therebetween.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described. Certain changes may be made in embodying the above invention, and in the construction thereof, without departing from the spirit and scope of the invention. It is intended that all matter contained in the above description and shown in the accompanying drawings shall be interpreted as illustrative and not meant in a limiting sense.

The invention claimed is:

1. A load moving apparatus comprising in combination:
    a vehicle frame, said frame having a frame front end and a frame rear end and right and left vehicle frame sides and having a vehicle center of gravity,
    a pair of front endless tracks wherein one track of said pair being operably connected on the right side of the vehicle sides and the other track being operably connected on the left side of the vehicle sides, each of said front tracks having a track front end and a track rear end said front track front end being elevated with respect to said track rear end, said front track being in a fixed orientation on said vehicle frame,
    a pair of rear endless tracks wherein one track of said pair being operably connected on the right side of the vehicle sides and the other track being operably connected on the left side of the vehicle sides, each of said rear tracks having a track front end and a track rear end said rear track rear end being elevated with respect to said rear track front end, said rear track being in a fixed orientation on said vehicle frame, and said front track pair and said rear track pair being secured to the frame in a fixed position in relation to the other track pair,
    a load carrying means extending from said frame front end,
    a vehicle weight fulcrum area comprising said front track rear end and said rear track front end said vehicle weight fulcrum area operating to shift said vehicle center of gravity from said rear pair of endless tracks onto said front pair of endless tracks in response to a load on said load carrying means and to load said vehicle weight onto said front tracks such that said front tracks become operable to steer and move the apparatus and to unload said vehicle weight from said rear tracks such that said rear tracks rear end is spaced from contact with a surface on which the vehicle is operating, and
    a power supply means for providing operating power to said front and rear endless tracks and said load carrying means.

2. The apparatus as claimed in claim 1 further comprising a tow bar connected to said vehicle frame.

3. The apparatus as claimed in claim 2 further comprising a sleeve connected to said vehicle frame for supporting said tow bar and a piston within said sleeve to provide telescoping movement of said tow bar to extend and retract said tow bar with respect to said sleeve.

4. The apparatus as claimed in claim 2 further comprising a ram secured within a bulkhead, said ram connected to said tow bar to resist front-to-rear movement of said tow bar.

5. The apparatus as claimed in claim 3 further comprising a ram secured within a bulkhead, said ram connected to said sleeve to resist front-to-rear movement of said sleeve.

6. The apparatus as claimed in claim 2 further comprising a piston connected to said vehicle frame and connected to a front portion of said tow bar to change the vertical position of said tow bar front portion with respect to said vehicle frame.

7. The apparatus as claimed in claim 2 further comprising a piston connected to said vehicle frame and connected to a rear portion of said tow bar to change the vertical position of said tow bar rear portion with respect to said vehicle frame.

8. The apparatus as claimed in claim 3 further comprising a piston connected to said vehicle frame and connected to a front portion of said sleeve to change the vertical position of said sleeve front portion with respect to said vehicle frame.

9. The apparatus as claimed in claim 3 further comprising a piston connected to said vehicle frame and connected to a rear portion of said sleeve to change the vertical position of said sleeve rear portion with respect to said vehicle frame.

10. The apparatus as claimed in claim 1 wherein said load carrying means is a lift arm.

11. The apparatus as claimed in claim 10 further comprising a sleeve connected to said vehicle frame for supporting said lift arm and a piston within said sleeve to provide telescoping movement of said lift arm to extend and retract said lift arm with respect to said sleeve.

12. The apparatus as claimed in claim 10 further comprising a ram secured within a bulkhead, said ram connected to said lift arm to resist front-to-rear movement of said lift arm.

13. The apparatus as claimed in claim 11 further comprising a ram secured within a bulkhead, said ram connected to said sleeve to resist front-to-rear movement of said sleeve.

14. The apparatus as claimed in claim 10 further comprising a piston connected to said vehicle frame and connected to a front portion of said lift arm to change the vertical position of said lift arm front portion with respect to said vehicle frame.

15. The apparatus as claimed in claim 10 further comprising a piston connected to said vehicle frame and connected to a rear portion of said lift arm to change the vertical position of said lift arm rear portion with respect to said vehicle frame.

16. The apparatus as claimed in claim 11 further comprising a piston connected to said vehicle frame and connected to a front portion of said sleeve to change the vertical position of said sleeve front portion with respect to said vehicle frame.

17. The apparatus as claimed in claim 11 further comprising a piston connected to said vehicle frame and connected to a rear portion of said sleeve to change the vertical position of said sleeve rear portion with respect to said vehicle frame.

18. The apparatus as claimed in claim 1 further comprising first and second tow wheels mounted on said vehicle frame said tow wheels being downwardly extendable to contact a surface on which the apparatus is positioned to space said front endless tracks and said rear endless tracks above the surface for towing of said apparatus.

19. The apparatus as claimed in claim 1 further comprising a radio frequency remote controller and a radio frequency receiver on said apparatus, said receiver being operably connected to a set of vehicle controls for operating said pair of front endless tracks and said pair of rear tracks and said load carrying means for operation of said vehicle by an operator positioned at a distance from said apparatus.

20. The apparatus as claimed in claim 1 further comprising a removable operator cab.

* * * * *